Figure 1:
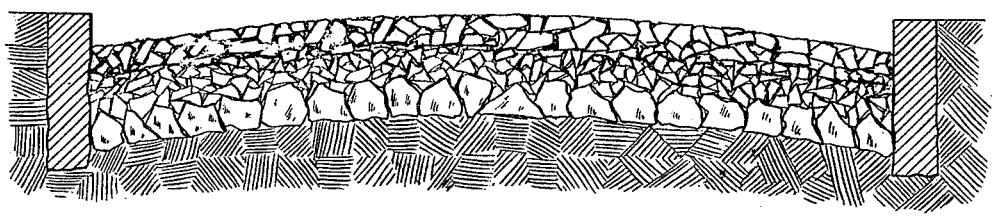

No. 727,508.

Patented May 5, 1903.

UNITED STATES PATENT OFFICE.

FREDERICK JOHN WARREN, OF NEWTON, MASSACHUSETTS.

PAVEMENT.

SPECIFICATION forming part of Letters Patent No. 727,508, dated May 5, 1903.

Application filed May 18, 1901. Serial No. 60,819. (No specimens.)

*To all whom it may concern:*

Be it known that I, FREDERICK JOHN WARREN, a citizen of the United States, residing at Newton, in the county of Middlesex and State of Massachusetts, have invented a new and useful Improvement in Pavements, of which the following is a full, clear, and exact description.

The invention relates to an improvement in the class of pavements consisting of a base of mineral grains of various sizes united by a cementing medium of asphalt cement or composition, which constituents are thoroughly incorporated together and form the upper wearing-surface of the pavement.

The invention is based on the discovery that the cementing medium, which is composed of a relatively hard asphalt softened with a softer asphalt or oil flux or a relatively soft natural asphalt without the addition of flux, is subject to deterioration by the oxidation, volatilization, or disintegration of the softening oils or asphalt, and when this takes place the cementing medium, being robbed of its softening elements, becomes hard and brittle, causing the pavement to flake, crack, and chip, lessening its life and usefulness.

The ordinary method of constructing asphalt roadways is with the use of fine sand admixed with an asphalt cement of the consistency produced by the use of from sixteen to twenty pounds of petroleum residuum of 20° gravity Baumé with one hundred pounds of Trinidad Lake refined asphalt, and the larger portion of the best pavements have been laid with an asphalt cement of the consistency which would be produced by the use of eighteen pounds of petroleum residuum. A pavement constructed with the cement as a binding medium would become hard, brittle, and lifeless in cold weather on losing one-sixth of its softening-oil from the action of the sun and the elements or from other causes.

I have discovered that by the proper selection of the mineral portion of the pavement a much softer asphaltic cement can be used, relying principally on the rigidity of the mineral aggregates to prevent the displacement of the surface by traffic. It will then be seen that if an asphaltic cement can be used softer than that produced by the use of twenty-two pounds of petroleum residuum with one hundred pounds Trinidad Lake refined asphalt the amount of fluxing-oil which can be lost and still maintain the cementing medium plastic is greatly increased, and hence the life and usefulness of the pavement are largely enhanced.

I prefer to use in connection with bituminous macadam roadways an asphalt cement of such consistency as would be produced by the addition of from twenty-two to thirty-five pounds of petroleum residuum, varying the consistency with the rigidity of the mineral aggregate when rolled; but under favorable conditions even softer cement may be used with equally good effect.

Any combination of mineral elements which shall produce stability may be used, and I do not limit myself to any especial proportion of sizes for producing this result.

In the drawings I have shown conventional representations of a pavement having the features of my invention.

Figure 2:
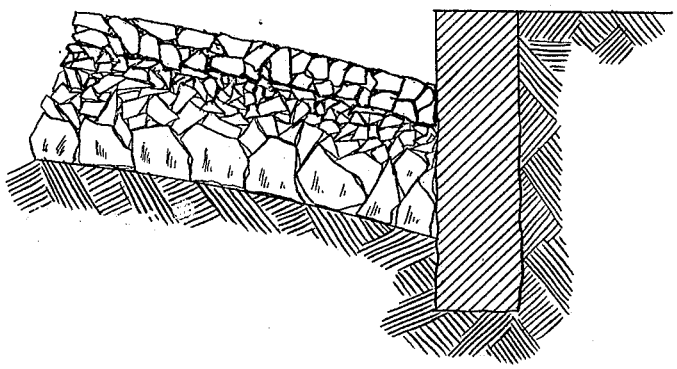

Figure 1 is a view in cross vertical section of such a pavement, and Fig. 2 is an enlarged view of the same.

Before the invention of the type of street-pavements to which my present invention belongs the use of a relatively soft bituminous composition in street-pavements was unknown. This arose from the fact that it was necessary to use a bituminous composition that would be hard enough when laid to maintain the mineral ingredients in position. I have discovered not only that it is desirable to use mineral ingredients which from their size and proportions will thus provide a stability which does not rely principally upon the bituminous composition, but I have also discovered that because this duty is taken from the bituminous composition and transferred to the mineral base a softer bituminous composition may be employed in the pavement, as its principal use is now to fill the interstices and act as a waterproofing medium and as a reinforce.

I prefer a bituminous composition having the degree of softness which I have above described. The use of such a bituminous composition very much improves the pavement, in that it increases its life very remarkably. It provides a cushioning or elasticity for it which helps traffic. It is constantly self-repairing under use. It stands strains of variations of temperature without cracking or disintegrating. It deadens sound and prevents the formation of dust, and last, but not least, it also can be laid much more cheaply, because it is possible to lay it at temperatures of 150° or less rather than at 300°, as is requisite with the old form of asphalt pavement.

Having thus fully described my invention, I claim and desire to secure by Letters Patent of the United States—

1. A wearing-section of a street-pavement consisting of a mineral base composed of mineral elements selected and combined to provide the base with inherent stability, and a bituminous uniting and combining medium comprising a bituminous composition having the degree of softness herein indicated and adapted to fill the interstices and provide a flexible, waterproof, coherent, cushioning medium.

2. A mixture of mineral or wearing ingredients so graded and mixed as to have an inherent stability in combination with an asphalt cement of a consistency softer than twenty-two parts of petroleum residuum of 20° gravity Baumé in one hundred parts of Trinidad Lake asphalt.

3. A pavement composed of mineral or wearing ingredients having an inherent stability and a cement of a permanent consistency softer than twenty-two parts of petroleum residuum of 20° gravity Baumé in one hundred parts of Trinidad Lake asphalt.

4. A pavement composed of mineral or wearing ingredients so graded and admixed as to have an inherent stability and a cement of a consistency softer than twenty-two parts of petroleum residuum of 20° gravity Baumé in one hundred parts of Trinidad asphalt.

5. A pavement of mineral or wearing ingredients having an inherent stability and a cement of a permanent softness equal to that resulting from treating one hundred parts of Trinidad Lake asphalt with from twenty-two to thirty-five parts of petroleum residuum of 20° gravity Baumé.

FREDERICK JOHN WARREN.

Witnesses:
F. F. RAYMOND, 2d,
J. M. DOLAN.